(12) United States Patent
Reivers

(10) Patent No.: US 6,485,093 B2
(45) Date of Patent: Nov. 26, 2002

(54) OPEN ROOF CONSTRUCTION FOR A VEHICLE

(75) Inventor: Petrus Gerardus Marie Reivers, Arcen (NL)

(73) Assignee: Inalfa Industries B.V. (NL)

( * ) Notice: Subject to any disclaimer, the term of this patent is extended or adjusted under 35 U.S.C. 154(b) by 0 days.

(21) Appl. No.: 09/766,869

(22) Filed: Jan. 19, 2001

(65) Prior Publication Data
US 2001/0011837 A1 Aug. 9, 2001

(30) Foreign Application Priority Data
Jan. 21, 2000 (NL) .............................. 1014151

(51) Int. Cl.⁷ .................................................. B60J 7/22
(52) U.S. Cl. ..................................... 296/217; 296/180.1
(58) Field of Search .............................. 296/217, 180.1; 244/199

(56) References Cited

U.S. PATENT DOCUMENTS

| | | | |
|---|---|---|---|
| 3,311,406 A | 4/1964 | Fritsch | .................. 296/91 |
| 4,455,045 A * | 6/1984 | Wheeler | .............. 296/180.1 X |
| 5,058,837 A * | 10/1991 | Wheeler | .................. 244/199 |
| 5,074,234 A * | 12/1991 | Stearns, IV | .............. 244/199 X |
| 5,361,828 A * | 11/1994 | Lee et al. | .................. 165/109.1 |
| 5,598,990 A * | 2/1997 | Farokhi et al. | .......... 296/180.1 X |
| 5,836,643 A | 11/1998 | Preiss | .......................... 296/217 |
| 6,276,636 B1 * | 8/2001 | Krastel | .................. 244/199 X |

FOREIGN PATENT DOCUMENTS

| | | | |
|---|---|---|---|
| DE | 23 57 906 A1 | 5/1975 | |
| DE | 3925808 | * 2/1991 | ................. 296/217 |
| DE | 40 16 791 A1 | 11/1991 | |
| DE | 40 33 027 A1 | 4/1992 | |
| EP | 0 458 083 A1 | 11/1991 | |
| EP | 458083 | * 11/1991 | ............ 296/216.09 |
| EP | 0 733 506 A1 | 9/1996 | |

* cited by examiner

Primary Examiner—Dennis H. Pedder
(74) Attorney, Agent, or Firm—Westman, Champlin & Kelly, P.A.; S. Koehler

(57) ABSTRACT

An open roof construction for a vehicle comprising a roof opening that can be closed by a panel of which at least the rear edge can be pivoted upward and downward. A three-dimensional body is provided on the underside of said panel to influence the air flow, near the rear edge of the panel. The three-dimensional body generates swirls in the air flow over the panel.

12 Claims, 3 Drawing Sheets

OPEN ROOF CONSTRUCTION FOR A VEHICLE

BACKGROUND OF THE INVENTION

The invention relates to an open roof construction for a vehicle having a roof opening which can be closed by a panel of which at least the rear edge can be pivoted upward and downward, and wherein a body for locally influencing the air flow is provided on the underside of said panel, near said rear edge.

In an open roof construction of the type to which the present invention relates, which comprises a panel whose rear edge can be pivoted upward and downward (a so-called tilt panel), objectionable noises, in particular whistling noises, are produced in the open position of the panel. These noises, which depend on the pivoting angle and the driving speed of the vehicle, among other things, are produced especially (but not exclusively) during the first stage of pivoting the panel from the closed position to an open position. The noises that are produced are highly objectionable to the occupants of the vehicle. The cause of the objectionable noises is to be found inter alia in the underpressure generated above the roof of the vehicle as a result of the air flow over the panel, which causes the air to be drawn out from the interior of the vehicle through a gap that is formed at the location of the upwardly pivoted rear edge of the panel.

In the past, attempts have been made to prevent the occurrence of these objectionable noises. German patent no. 4016791 discloses an open roof construction for a vehicle, wherein the means for locally influencing the air flow is made up of a strip projecting downwards near the rear edge of the panel, on the free ends of which projections are present for influencing the air flow. The function of the strip provided with projections is to disturb coherent flow structures through the aforesaid gap. The means used in this prior art solution has a substantially two-dimensional shape (after all, with a minimum dimension in the direction of flow), whose dimension in a direction perpendicular to the panel surface is considerable. Accordingly, one drawback of this prior art solution is the fact that the obstruction in the gap that is formed by said means needs to be compensated by a greater pivoting movement of the rear edge of the panel if it is desired to maintain an unchanged effective gap between the rear edge of the panel and the roof of the vehicle. The increased pivotability, however, makes it necessary to adapt the technical construction of the panel (in particular the parts thereof that are to effect the movement of the panel) with all the concomitant drawbacks thereof (among which an increased space requirement for construction parts, higher cost, etc.).

SUMMARY OF THE INVENTION

An open roof construction according to an aspect of the present invention has at least one three-dimensional body that generates swirls in the air flow. The term "three-dimensional body" is used to indicate the difference with the prior art, wherein said means described above has a substantially two-dimensional plate-shaped part. According to the present invention, on the other hand, a three-dimensional body is used, wherein the third dimension, seen in the direction of flow, is considerable. In particular, it is this dimension, in the direction of flow, that contributes to the generation of swirls in the air flow. The swirls disturb the air flow to such an extent that objectionable background noises, such as whistling, do not occur.

In one embodiment of the open roof construction according to the present invention, the height of the three-dimensional body, measured in a direction perpendicular to the panel, is in an order of approximately three times the thickness of the panel. In this embodiment, the obstruction of the flow that is caused by the three-dimensional body is minimized, so that minimal adaptation, if any, of the pivoting height of the rear edge of the panel is required. Furthermore it is advantageous with regard to the generation of swirls if the three-dimensional body includes at least one windward surface (i.e. facing towards the air flow) and at least one leeward surface (i.e. facing away from the air flow). The generation of swirls takes place at the transition between the two surfaces. In a further embodiment, of at least a portion of one or all of the windward and leeward surfaces is oriented obliquely to the surface of the panel.

In another embodiment, the three-dimensional body includes sharp transition edges between a respective windward surface and a respective leeward surface on its rear side, seen in the direction of flow, wherein the edges include an angle with the direction of flow.

As a result of said angle (which may have any desired value), swirls are generated in the air flow at the location of said sharp transition edges, which swirls lead to the formation of so-called vortex streets. The dimensions of the vortex streets depend on the location on the transition edge where the swirls are generated. The location where the swirls are generated can be altered to cover a large range of frequencies (with respect to the objectionable background noises that occur) and prevent objectionable background noises occurring over the entire frequency range. In the case of small panel openings, the total swirling of the exiting air flow aids in preventing objectionable noises.

In another embodiment, the three-dimensional body includes windward surfaces and leeward surfaces that gradually blend into one another. A sharply defined transition edge is lacking in this embodiment, however, the (gradual) transition between the windward and leeward surfaces can nevertheless lead to the generation of swirls.

Generally a number of three-dimensional bodies will be arranged beside and/or behind each other. These bodies may or may not be arranged adjacent to each other.

In addition, geometric shapes can be used for the three-dimensional bodies. For example, it is possible to use a three-dimensional body that comprise of a block having a zigzag rear edge and/or front edge, wherein the block extends substantially transverse to the panel. The sharp transition edges that produce the swirling effect are formed at least at the location of said zigzag rear edge and/or front edge.

Another embodiment is a three-dimensional body which comprises a tetrahedron, one surface of which coincides with the underside of the panel having one corner point of the surface pointing in the direction of flow, or in a direction opposite thereto. When the tetrahedron has a corner point of the surface pointing in the direction of flow, the tetrahedron has a windward surface, wherein the windward surface diverges in the direction of flow with respect to the panel surface, with two mutually converging (in the direction of flow) leeward surfaces adjoining the surface. The transition edges between the diverging surface and the two converging surfaces produce a swirling effect. If the corner point of the tetrahedron points in a direction opposite the direction of flow, there are two mutually diverging windward surfaces, and one leeward surface, which converges with respect to the panel surface.

It is also possible to use a so-called NACA vortex turbulator as the three-dimensional body. This is a wedge-shaped body, which was developed by NACA (the predecessor of the present US NASA) for generating swirls.

It is possible to attach the aforesaid three-dimensional bodies to an existing panel after manufacture, but it is also possible to form the bodies thereon during the production stage. In the latter case, the three-dimensional body can be integral with the panel. Thus the three-dimensional body may form part of the so-called panel encapsulation, which forms the underside (interior side) of the panel.

BRIEF DESCRIPTION OF THE DRAWINGS

The invention will now be explained in more detail with reference to the drawings, which illustrates a number of embodiments of the open roof construction according to the aspects of the present invention.

DETAILED DESCRIPTION OF ILLUSTRATIVE EMBODIMENTS

Figure 1:
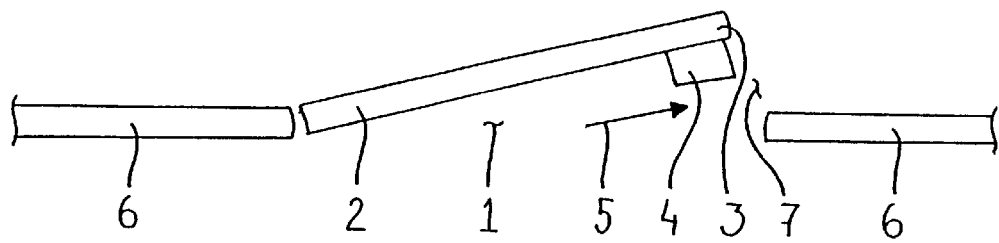
FIG. 1 is a schematic side view of an embodiment of the open roof construction according to the present invention.

FIG. 1 shows an open roof construction for a vehicle having a roof opening 1 which can be closed by a panel 2, whose rear edge 3 can be pivoted upward and downward. A body 4 for locally influencing air flow 5 is provided on the underside of panel 2, near rear edge 3. Air flow 5 is produced as a result of an underpressure being generated above roof 6, which causes air to be drawn from the interior of the vehicle through a gap 7 that is present between rear edge 3 of the panel 2 and roof 6. The presence of body 4 leads to air flow 5 being locally influenced proximate the body 4.

Figure 2:
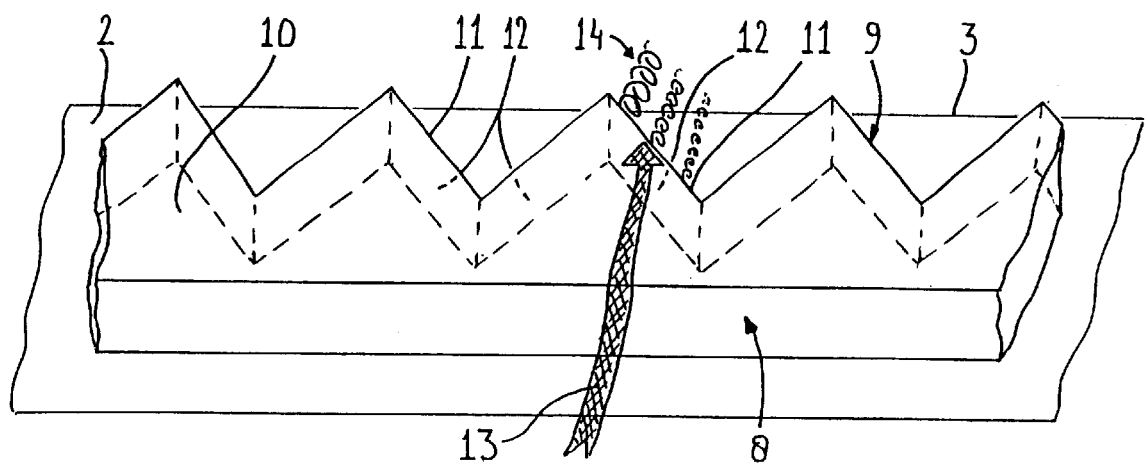
FIG. 2 is a larger-scale, perspective view of another embodiment.

FIGS. 2–6 illustrate the open roof construction in a direction obliquely upwards and rearwards (in the direction of rear edge 3) from a location under panel 2. FIG. 2 illustrates the inner side of panel 2 and the rear edge 3. Disposed near rear edge 3 is a block 8 extending substantially transverse to panel 2 that has a zigzag rear edge 9. The bottom face 10 of block 8, illustrated on the upper side in FIG. 2, forms a windward surface that is separated from leeward surfaces 12 on the rear side of block 8. Air flow 13 causes swirls 14 at the location of transition edge 11. The magnitude of said swirls 14 depends on the location where they are generated. In the illustrated example, the magnitude of the swirls 14 over edge 11 increases towards the rear (in the direction of the rear edge 3 of panel 2). The swirls 14 prevent the production of objectionable background noises, such as whistling noises, at the location of gap 7.

Figure 3:
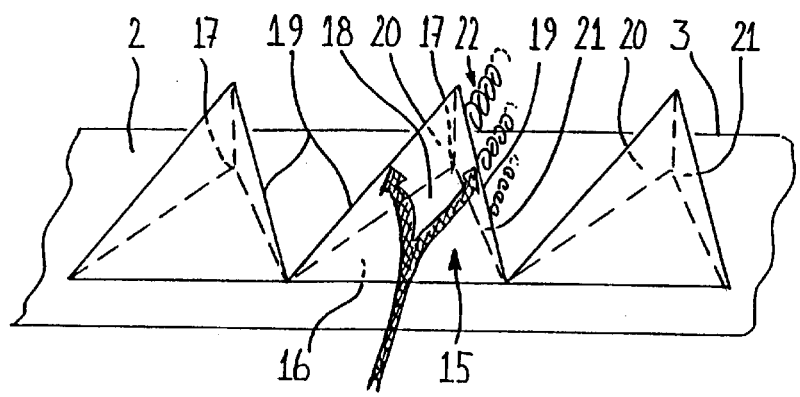
FIG. 3 is a perspective view of an alternative embodiment of the present invention.

FIG. 3 illustrates another embodiment of the open roof construction according to the present invention. In a view similar to FIG. 2, the three-dimensional bodies 15, in this case in the shape of tetrahedrons, can be distinguished. A first surface 16 of each tetrahedron coincides with the underside of panel 2. A corner point 17 of said surface 16 points in the direction of flow (i.e. in the direction toward the rear edge 3 of panel 2). As a result of this orientation of tetrahedron 15, another surface 18 forms a windward surface (which may or may not have a smooth transition with the underside of the panel 12) that diverges with respect to panel 2 and is separated from two leeward surfaces 20 and 21 by transition edges 19. Swirls 22 are generated at the transition edges 19 and help to prevent objectionable background noises, such as whistling noises.

As FIG. 3 illustrates, several three-dimensional bodies can be arranged adjacent to each other and in side-by-side relationship on panel 2. However, it is not always necessary for said bodies to be placed adjacent to each other. Furthermore it is conceivable for the three-dimensional bodies to also be arranged one behind another, seen in the direction of flow.

In one embodiment (not shown), the bodies are turned through 180 degrees, so that exactly the opposite side of the bodies faces towards the air flow (corner point 17 points in a direction opposed to the direction of flow). Surfaces 20 and 21 are the windward surfaces and surface 18 is the leeward surface in that case. Edges 19 continue to provide the swirling effect.

The tetrahedron illustrated in FIG. 3 may have such specific dimensions that it comprises a so-called NACA vortex turbulator. The height of the three-dimensional bodies, measured in a direction perpendicularly to the panel, can be approximately three times the thickness of panel 2.

Figure 4:
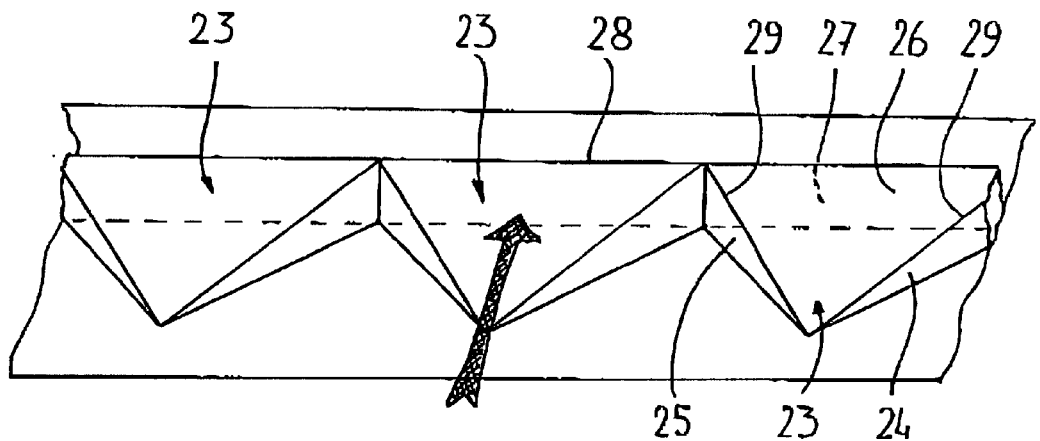
FIG. 4 is a perspective view of three-dimensional bodies according to another embodiment.

FIG. 4 illustrates three-dimensional bodies 23 arranged in side-by-side relationship and include three windward surfaces 24–26 and one leeward surface 27. The transition edge 28 between surfaces 26 and 27 provides the swirling effect in this case. However, transition edges 29 between surfaces 24, 25 and surface 26 may also contribute to swirl generation.

Figure 5:
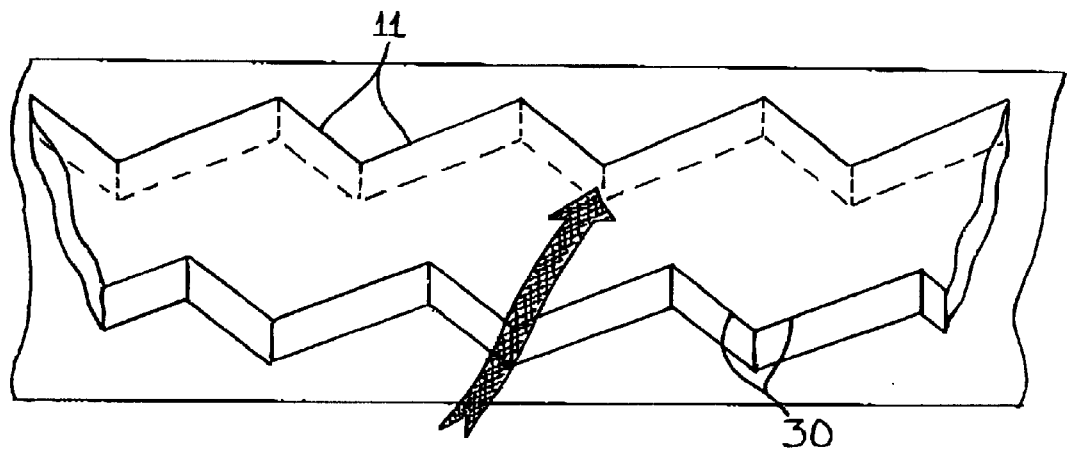
FIG. 5 is a perspective view of three-dimensional bodies according to yet an alternative embodiment.

Another embodiment is illustrated in FIG. 5 and comprises a zigzag rear edge 11 and a zigzag front edge 30. As a result, a swirling effect can occur at the location of edge 30.

Figure 6:
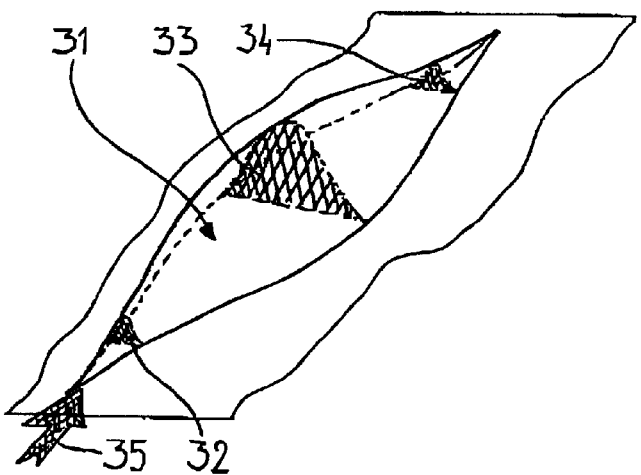
FIG. 6 illustrates a perspective view of an embodiment which includes windward surfaces and leeward surfaces that gradually blend into one another.

FIG. 6 illustrates an embodiment wherein there is no sharp transition between windward and leeward surfaces. In order to explain the shape of the three-dimensional body that is illustrated in FIG. 6, three sections 32–34 are illustrated. The direction of flow is indicated by arrow 35. The transition between windward surfaces and leeward surfaces is located near the place where the body has its largest cross-sectional area 33, and consequently the main part of the swirling effect will take place at that location.

Figure 7:
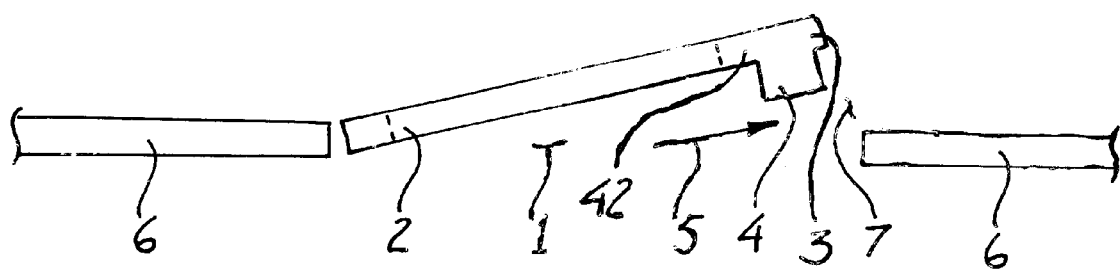
FIG. 7 is a schematic side view of a second embodiment of the open roof construction according to the present invention.

It is possible to attach the aforesaid three-dimensional bodies to an existing panel 2 after manufacture, but it is also possible to form the bodies thereon during the production stage. Referring to FIG. 7, in the latter case, the three-dimensional body 4 can be integral with the panel 2. Thus the three-dimensional body may form part of the so-called panel encapsulation 42, which forms the underside (interior side) of the panel.

The invention is not limited to the above-described embodiments, which can be varied in several ways without departing from the scope of the invention.

What is claimed:

1. An open roof construction for a vehicle comprising: a movable panel for opening and closing the roof opening, the panel having a front edge and a rear edge, wherein at least the rear edge of the panel can be pivoted upward and downward; and at least one three-dimensional body provided on an underside of the panel spaced-apart from the rear edge and disposed between the front edge and the rear edge, wherein the three dimensional body is adapted to generate swirls in air flow.

2. The open roof construction according to claim 1, wherein the height of the three-dimensional body, measured in a direction perpendicularly to the panel, is approximately three times the thickness of the panel.

3. The open roof construction according to claim 1, wherein the three-dimensional body includes at least one windward surface and at least one leeward surface.

4. The open roof construction according to claim 3, wherein the three-dimensional body includes sharp transition edges between said at least one windward surface and said at least one leeward surface on its rear side, wherein the transition edges are oriented at an angle with the direction of flow.

5. The open roof construction according to claim 3, wherein the three-dimensional body includes at least one windward surface and at least one leeward surface that gradually blend into one another.

6. The open roof construction according to claim 1 and further comprising a plurality of three-dimensional bodies arranged proximate each other.

7. The open roof construction according to claim 6, wherein the three-dimensional bodies are arranged adjacent to each other.

8. The open roof construction according to claim 1, wherein the three-dimensional body comprises a block having at least one of a zigzag rear edge and a zigzag front edge, wherein the block extends across the panel in a direction parallel to the rear edge.

9. The open roof construction according to claim 1 wherein the three-dimensional body comprises a tetrahedron, having one surface, coinciding with the underside of the panel, with one corner point of said surface pointing in the direction of flow.

10. The open roof construction according to claim 1, wherein the panel includes a panel encapsulation, the three-dimensional body being integral with the panel encapsulation.

11. An open roof construction for a vehicle having a roof opening comprising: a moveable panel for opening and closing the roof opening, the panel having a front edge and a rear edge, wherein at least the rear edge of the panel can be pivoted upward and downward; and three-dimensional means located on an underside of the panel spaced-apart from the rear edge and disposed between the front edge and the rear edge for generating swirls in air flow.

12. The open roof construction of claim 1 wherein the three-dimensional body comprises a tetrahedron, having one surface, coinciding with the underside of the panel, with one corner point of said surface pointing in a direction opposite of flow.

* * * * *